United States Patent
Lee et al.

(10) Patent No.: US 6,420,071 B1
(45) Date of Patent: Jul. 16, 2002

(54) METHOD FOR IMPROVING THE DURABILITY OF ION INSERTION MATERIALS

(75) Inventors: Se-Hee Lee, Lakewood; C. Edwin Tracy, Golden, both of CO (US); Hyeonsik M. Cheong, Seoul (KR)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 09/532,168

(22) Filed: Mar. 21, 2000

(51) Int. Cl.$^7$ .......................... H01M 6/14; H01M 6/04; H01M 6/18; H01M 6/00
(52) U.S. Cl. .................. 429/300; 429/126; 429/144; 429/304; 29/623.1
(58) Field of Search ................... 429/300, 304, 429/126, 144, 162, 127; 29/623.1

(56) References Cited

U.S. PATENT DOCUMENTS

| | | | |
|---|---|---|---|
| 4,119,770 A | * 10/1978 | Land | 429/152 |
| 4,367,267 A | 1/1983 | Oi | 429/101 |
| 4,668,593 A | 5/1987 | Sammells | 429/191 |
| 5,321,544 A | * 6/1994 | Parkhe et al. | 359/265 |
| 5,404,244 A | * 4/1995 | Van Dine et al. | 359/265 |
| 5,464,706 A | 11/1995 | Dasgupta et al. | 429/194 |
| 5,591,540 A | * 1/1997 | Louie et al. | 428/35.2 |
| 5,612,153 A | 3/1997 | Moulton et al. | 429/191 |
| 5,677,081 A | 10/1997 | Iwamoto et al. | 429/191 |
| 5,695,887 A | 12/1997 | Amatucci et al. | 429/48 |
| 5,705,292 A | 1/1998 | Yukita et al. | 429/137 |
| 5,724,177 A | * 3/1998 | Ellis et al. | 359/265 |
| 5,728,181 A | * 3/1998 | Jung et al. | 29/623.1 |
| 5,919,571 A | * 7/1999 | Badding et al. | 359/269 |
| 5,948,562 A | * 9/1999 | Fulcher et al. | 429/162 |
| 6,080,511 A | * 6/2000 | Kejha | 429/300 |
| 6,094,292 A | * 7/2000 | Goldner et al. | 359/265 |

OTHER PUBLICATIONS

1) Kono, M.; Hayashi, E.; and Watanabe, M., "Preparation, Mechanical Properties, and Electrochemical Characterization of Ploymer Gel Electrolytes Prepared from Poly (alkylene oxide) Macromonomers", *Journal of The Electrochemical Society*, 146 (5) 1626–1632 (1999).
2) Lee, S.; Liu, P.; Tracey, C.E.; Benson, D., "All–Solid–State Rocking Chair Lithium Battery on a Flexible A1 Substrate", *Electrochemical and Solid–State Letters*, 2 (9) 425–427 (1999).
3) O'Brien, N.; Mathew, J.G.H.; Hichwa, B.P., "Electrochromic Devices", *Vacuum & Thinfilm*, pp. 28–32, Jul. 1999.
4) Mouchon, E.; Klein, L.C.; Picard, V.; Greenblatt, M., "Sol–Gel Lithium Silicate Electrolyte Thin Films", Mat. Res. Soc. Symp. Proc. vol. 346, pp. 189–200, 1994 Materials Research Society.
5) Lampert, C.M, "Electrochromic Materials and Devices for Energy Efficient Windows", *Solar Energy Materials 11* Elsevier Science Publishers B.V. 1984 North–Holland, Amsterdam.
6) Beni, G.; Shay, J.L., "Ion–Insertion Electrochromic Displays", *Advances in Image Pickup and Display*, vol. 5. pp. 83–87, 1982.
7) Faughnan, B.W.; Crandall, R.S., "Electrochromic Displays Based on WO$_3$", *Display Devices*, J.I. Pankove, Ed. 1980.

* cited by examiner

*Primary Examiner*—Tom Dunn
*Assistant Examiner*—Zidia Pittman
(74) *Attorney, Agent, or Firm*—Paul J. White

(57) ABSTRACT

The invention provides a method of protecting an ion insertion material from the degradative effects of a liquid or gel-type electrolyte material by disposing a protective, solid ion conducting, electrically insulating, layer between the ion insertion layer and the liquid or gel-type electrolyte material. The invention further provides liquid or gel-type electrochemical cells having improved durability having a pair of electrodes, a pair of ion insertion layers sandwiched between the pair of electrodes, a pair of solid ion conducting layers sandwiched between the ion insertion layers, and a liquid or gel-type electrolyte material disposed between the solid ion conducting layers, where the solid ion conducting layer minimizes or prevents degradation of the faces of the ion insertion materials facing the liquid or gel-type electrolyte material. Electrochemical cells of this invention having increased durability include secondary lithium batteries and electrochromic devices.

30 Claims, 8 Drawing Sheets ize:14px">US 6,420,071 B1

METHOD FOR IMPROVING THE DURABILITY OF ION INSERTION MATERIALS

CONTRACTUAL ORIGIN OF THE INVENTION

The United States Government has rights in this invention under Contract No. DE-AC36-99GO10337 between the U.S. Department of Energy and the National Renewable Energy Laboratory, a Division of Midwest Research Institute.

BACKGROUND OF THE INVENTION

1. Field of Invention

This invention relates generally to devices comprising ion insertion materials and methods for manufacturing the same, and more particularly to methods of protecting ion insertion or intercalation materials in electrochemical cells, such as lithium ion batteries or electrochromic devices, to improve durability of such materials.

2. Description of the State of the Art

Electrochemical cells find utility in numerous devices such as lithium rechargeable batteries and electrochromic devices. Small-sized lithium rechargeable (secondary) batteries have been widely used as a power sources for portable electronic equipment in the fields of office automation equipment, household electronic equipment, communication equipment and the like. Electrochromic devices are highly beneficial in a variety of practical applications where light modulation is desirable. These include, for example, alphanumeric displays for clocks, watches, computer monitors, outdoor advertisement and announcement boards, and other types of displays. In addition, an important application for the electrochromic devices of the present invention is light modulation in, for example, mirrors of variable reflectance (as are used in some automotive rearview mirrors), sunglasses, automotive windshields, sunroofs, and building windows. Both rechargeable lithium batteries and electrochromic devices operate on the principle of an electrochemical cell (also referred to as a galvanic cell). An electrochemical cell is a composite structure containing a negative electrode (the cathode), a positive electrode (the anode) and an ion-conducting electrolyte interposed therebetween.

A conventional lithium rechargeable battery has a negative electrode (the cathode) comprising an active material which releases lithium ions when discharging, and intercalates or absorbs lithium ions when the battery is being charged. The negative active materials commonly utilized in lithium ion batteries include niobium pentoxide, carbon, and similar materials capable of intercalating lithium ions. The positive electrode (the anode) of a conventional lithium ion battery contains a substance capable of reacting chemically or interstitially with lithium ions, such as transition metal oxides, including vanadium oxides, cobalt oxides, iron oxides, manganese oxide and the like. In general, the positive active material comprised by the positive electrode will react with lithium ions in the discharging step of the battery, and release lithium ions in the charging step of the battery. Since both the anode and cathode materials of lithium ion batteries can intercalate lithium ions, the anode and cathode materials are often referred to as "ion insertion materials" or "intercalation materials." The external faces of the anode and cathode lithium ion batteries are usually equipped with some structure or component to collect the charge generated by the battery during discharge and to permit connection to an external power source during recharging. Conventional lithium ion batteries usually comprise a non-aqueous liquid or a solid polymer electrolyte, which has dissolved lithium salt that is capable of dissociating to lithium ion(s) and an anions, such as for example lithium perchlorate, lithium borohexafluoride, and other lithium salts that are soluble in the electrolyte utilized. During discharge, lithium ions from the anode pass through the liquid electrolyte to the electrochemically active material of the cathode, where the ions are taken up or absorbed with the simultaneous release of electrical energy. During charging, the flow of ions is reversed so that lithium ions pass from the electrochemically active cathode material through the electrolyte and are plated back onto the anode.

Another example of an electrochemical cell is an electrochromic device, such as those used on electrochromic windows. Conventional electrochromic windows comprise multi-layered devices, similar to a lithium secondary battery, comprising a pair of transparent electrodes sandwiched between two transparent substrates. A pair of ion-insertion materials, referred to as the electrochromic layer and an ion storage layer, are sandwiched between the pair of electrodes. The electrochromic layer of an electrochromic device is an electrochromic ion insertion material, which reversibly changes its color by the injection or extraction of ions as a result of an application of an electric potential. This reversible color change in a material caused by an applied electric field or current is known as "electrochromism." The ion storage layer of an electrochromic device is an ion insertion material, which may or may not have electrochromic properties. An ion-conducting material (also known as an electrolyte layer) is disposed between the electrochromic layer and the ion storage layer. Positive ions are induced by the voltage to move through the ion conducting material, i.e., electrolyte, in the direction from the ion storage layer and toward the electrochromic layer. Upon application of a voltage across the electrochromic device, electrons flow through an external circuit in a direction from the electrode adjacent the ion storage layer to the electrode adjacent the electrochromic layer. Simultaneously, a resulting current is conducted by ions, such as lithium ions ($Li^+$) or hydrogen ions ($H^+$). The positive ions are induced by the voltage to move through the ion conducting layer in the direction from the ion storage layer and toward the electrochromic layer.

An example of an electrochromic material used in an electrochromic device is a tungsten oxide ($WO_3$) film. To color the $WO_3$ film, a battery is connected between the pair of transparent conductive electrodes. When a negative voltage is applied to one of the electrodes (the negative electrode), electrons from the negative electrode and lithium ions from the lithium electrolyte are injected simultaneously into the $WO_3$ film. This ion injection process continues until the colorless $WO_3$ is converted into the blue-colored $Li_xWO_3$. To bleach the blue-colored $Li_xWO_3$ film, the polarity is reversed so that the electrons and lithium ions are depleted from the $Li_xWO_3$ film. Current flows until the entire film is restored to its original $WO_3$ (colorless) state. Thus, it is convenient to think of the coloring and bleaching process of an electrochromic device as the charging and discharging of a battery. Typically, for maximum efficiency, electrochromic devices include an electrochromic layer comprising an electrochromic material and an ion storage layer comprising a "complementary" electrochromic material, i.e., an electrochromic layer that becomes colored upon positive ion insertion and an ion storage material that becomes colored upon removal of positive ions. As a result of this type of complementary system, the electrochromic and ion storage layers change color simultaneously as a result of an applied voltage to produces a more highly colored (darker) state.

Electrochemical devices such as lithium secondary batteries and electrochromic devices can use either a solid, liquid, or polymer gel-type electrolyte as the ion conducting layer, and therefore are referred to as either solid-state, liquid or polymer gel (also known as gel-type) devices, respectively. The ion conducting layer must possess high ionic conductivity (i.e., conducts positive ions such as $Li^+$ or $H^+$) and low electronic conductivity (does not conduct electrons).

Solid-state electrochemical devices have solid thin-film electrolytes made of so-called fast-ion conductor materials, in which either lithium or hydrogen ions diffuse readily. Examples of such fast-ion conductor materials include $Li_3N$, $Li_2NH$, $Li_{1-x}M_xTi_{2-x}(PO_4)_3$, and $LiAlF_4$. During the manufacture of solid-state electrochemical devices, the solid electrolyte layer (which is disposed between the cathode and the anode) is deposited in a manner which often results unavoidably in the formation of "pinholes". Pinholes are defects in the solid electrolyte layer which act as electron "channels" between the cathode and the anode, such as the electrochromic layer and the ion storage layer in an electrochromic device. Consequently, in an electrochromic device, if a pinhole is present in the solid electrolyte layer, electrons will flow from the electrochromic layer, through the pinhole in the solid electrolyte layer, and back to the ion storage layer. Under this condition, known as "shorting", electrons do not remain in the electrochromic layer during applied voltage; therefore, the electrochromic device cannot remain colored. Due to the inherent pinhole defects in the manufacture of solid state electrochromic devices, it is difficult to scale up these devices for larger applications, such as for electrochromic windows.

Liquid or gel-type electrochemical devices were developed to alleviate the "shorting" problems associated with solid state electrochemical devices. Liquid or gel-type electrochemical devices have a liquid or gel material as the ion conducting layer, which is typically formed by sandwiching the liquid or gel-type ion conducting material between the cathode and the anode after the electrochemical device has been assembled. Consequently, liquid electrochemical devices do not suffer the drawback of pinholes as in solid-state devices. Therefore, they are easier to scale up than the solid state devices. However, liquid or gel-type electrochemical devices are often less durable than solid state devices, possibly due to degradation of the ion storage layer and the electrochromic layer by the liquid electrolyte. As the electrochromic and ion storage layers degrade, it becomes necessary to apply increasing amounts of voltage or current to the device to achieve the same degree of color intensity.

A need therefore exists for a liquid or gel-type electrochemical device that has increased durability and wherein the ion insertion materials do not suffer from the degradative effects of being in contact with the liquid or polymer gel electrolyte as in conventional liquid or gel-type electrochemical devices.

SUMMARY OF THE INVENTION

Accordingly, objects, features and advantages of the present invention are to provide an improved liquid or gel-type electrochemical cell based, for example, on lithium, which maintains its integrity over a prolonged life-cycle as compared to conventional liquid or gel-type electrochemical cells, and to provide a protective, solid ion conducting layer between the ion insertion material(s) and the liquid or gel-type electrolyte, wherein the protective layers prevent degradation of the ion insertion materials. The protective layers are characterized by an ability to conduct positively charged ions but are poor electronic conductors. The protective layers are of a sufficient thickness to restrict penetration of the liquid electrolyte layer and consequently reduce or prevent degradation of the ion insertion layer(s).

Accordingly, it is a general object of this invention to provide for a method of protecting an ion insertion material having a surface which faces a liquid or gel-type ion conducting material.

A more specific object of this invention is to provide a liquid or gel-type electrochemical device having increased durability.

Another specific object of the present invention is to provide a liquid or gel-type electrochemical device having improved cycling lifetime.

Another specific object of the present invention is to provide a liquid or gel-type electrochemical device having improved durability comprising a solid ion conducting layer disposed between a ion insertion layer and a liquid or gel-type ion conducting layer.

Another specific object of the present invention is to provide a liquid or gel-type electrochromic device which is able to maintain a substantially constant color intensity over time with repeated application of an electric current.

Another specific object of the present invention is to provide a liquid or gel-type electrochromic device having improved durability comprising a solid ion conducting layer disposed between an ion-insertion layer and a liquid or gel-type ion conducting layer.

Another specific object of the present invention is to provide a method of manufacturing a liquid or gel-type electrochemical cell having increased durability.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, an electrochemical cell of this invention comprises a pair of substrates, a pair of electrodes sandwiched between the pair of substrates, a pair of ion-insertion layers sandwiched between the pair of electrodes, a pair of solid ion conducting layers sandwiched between the ion insertion layers, and a liquid or gel-type ion conducting material disposed between the solid ion conducting layers.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

In the Drawings.

DETAILED DESCRIPTION OF THE PREFERRED EMBODIMENT

This invention generally provides a novel method and structure for inhibiting or preventing degradation of any ion insertion material having a surface that faces a liquid or gel-type electrolyte by inserting a protective solid ion conducting (electrolyte) layer between the ion insertion material and the liquid or gel electrolyte. This invention further provides liquid or gel-type electrochemical devices having increased durability, comprising a solid ion conducting (electrolyte) layer disposed between the ion insertion material and the liquid or gel-type electrolyte layers of the device. While the method and structures of this invention are not limited to applications to electrochemical cells, for convenience of explanation the preferred embodiments of this invention will be described in reference to an electrochemical cell, with the understanding that it applies to electrochromic and other devices that comprise similar materials or operate on similar principles.

Figure 1:
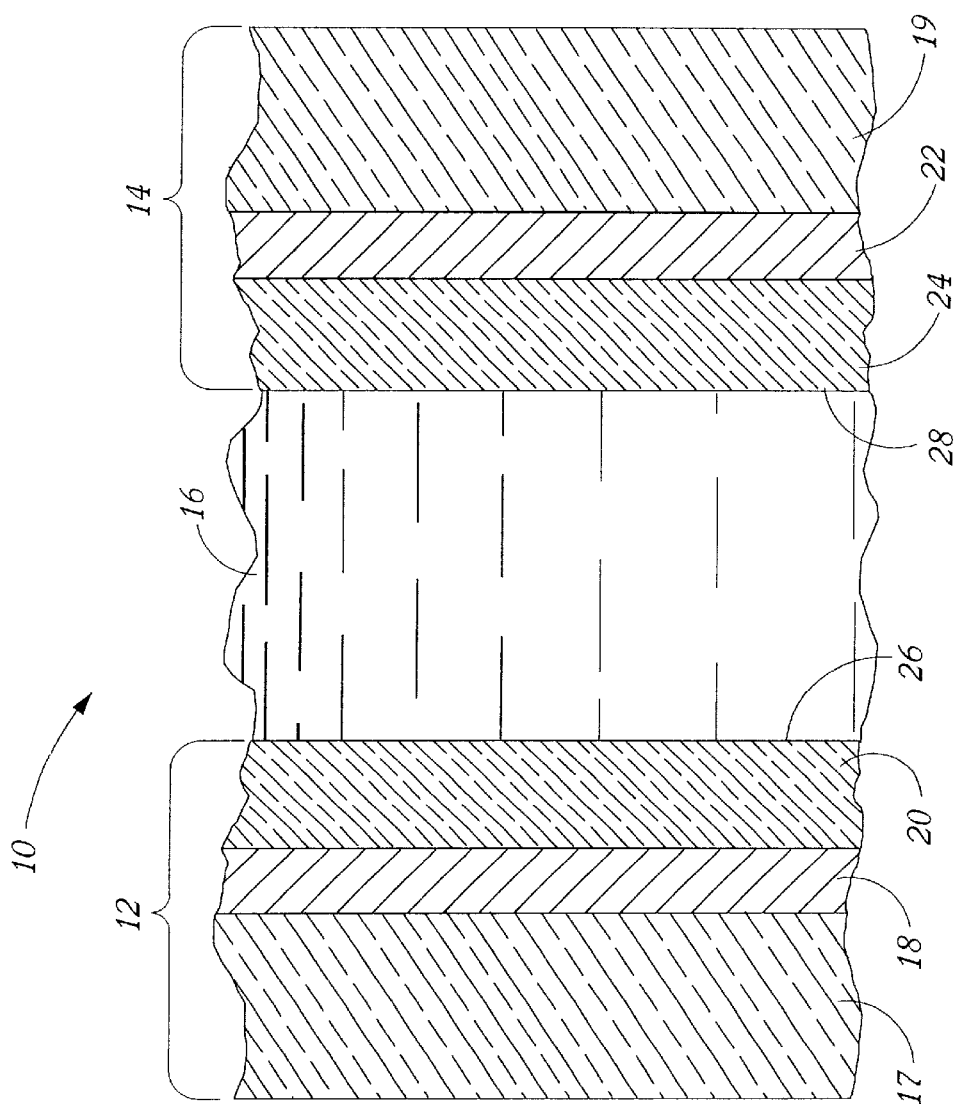
FIG. 1 is a diagrammatic cross-sectional view of a conventional (prior art) electrochemical cell comprising separate substrate, anode, and cathode layers.

As shown in FIG. 1, a conventional (prior art) electrochemical cell 10 has a first electrode-equipped section 12, a second electrode-equipped section 14, and an ion conducting layer 16 therebetween. The first electrode-equipped section 12 is the anode during discharge of cell 10, and the second electrode-equipped section 14 is the cathode during discharge of cell 10. The first electrode-equipped section 12 includes substrate 17, electrode 18, typically of nickel, iron, aluminum, stainless steel, and/or copper foil, and ion insertion material 20. When electrochemical cell 10 is a lithium battery, the ion insertion material 20 comprises lithium, or compounds and alloys of lithium, and is often referred to in the art as the "negative electrode" or "anode". When electrochemical cell 10 is an electrochromic device, the ion insertion material 20 typically comprises an electrochromic ion insertion material (discussed below) and is typically referred to as the electrochromic layer.

The second electrode-equipped section 14 includes substrate 19, electrode 22, typically of aluminum, nickel, iron, stainless steel, and/or copper, and ion insertion material 24 which is usually different than ion insertion material 20 in the first electrode-equipped section 12. When the electrochemical cell 10 is a lithium battery, the ion insertion material 24 is often referred to as the "positive electrode" or "cathode". When the electrochemical cell 10 is an electrochromic device, the ion insertion material 24 is typically referred to as the ion storage layer. The ion insertion material 24 in an electrochromic device may optionally be an electrochromic ion insertion material which is complementary to the negative electrode (discussed below). The ion conducting or electrolyte material 16 is positioned between the ion insertion material 20 and the ion insertion material 24.

Figure 2:
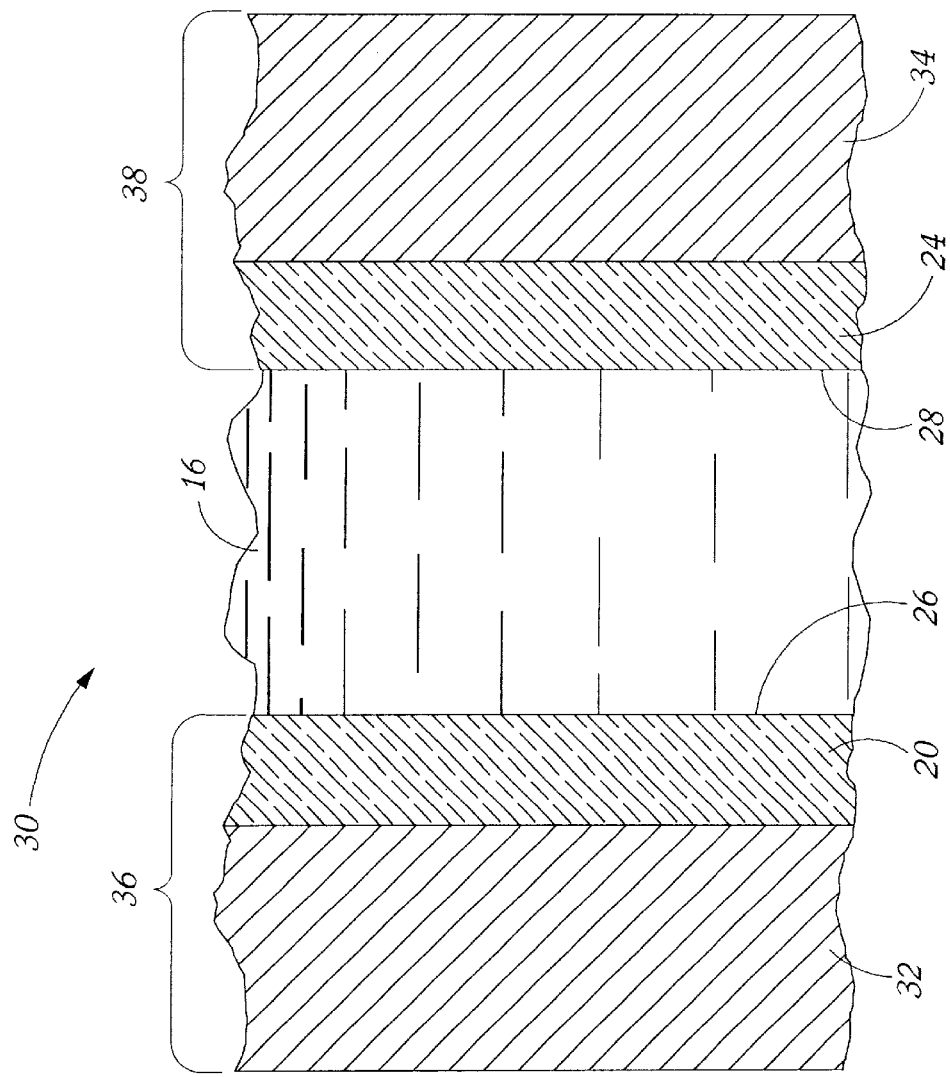
FIG. 2 is a diagrammatic cross-sectional view of an alternative conventional (prior art) electrochemical cell comprising a first substrate layer which serves as the anode, and a second substrate layer which serves as the cathode.

A variation of the above-described conventional (prior art) electrochemical cell 30 is shown in FIG. 2 and comprises a first electrode-equipped section 36, a second electrode-equipped section 38, and an ion conducting layer 16 therebetween. Section 36 comprises layer 32, which is both the first substrate and the anode of device 30, and section 38 comprises layer 34 which is both the second substrate and the cathode of device 30. Layers 20 and 24 of device 30 are ion insertion materials as described above.

A common problem associated with conventional liquid or gel-type electrochemical cells, such as cells 10 and 30 shown in FIGS. 1 and 2 wherein the ion conducting or electrolyte material 16 is a liquid or a gel, is degradation of faces 26 and 28 of the ion insertion materials 20 and 24, respectively. While not wishing to be bound by theory, the inventors believe that degradation of conventional liquid and gel-type electrochemical devices 10, in which each ion insertion layer 20 and 24 is interfaced with the liquid or gel-type ion conducting layer 16, may occur as a result of chemical corrosion of the ion insertion materials 20 and 24, respectively, by the liquid or gel ion conducting layer 16. Such problems are obviated in accordance with this invention by the use of protective, solid-state ion conducting layers interposed between the ion insertion materials and the liquid or gel-type ion conducting layer 16, wherein the solid-state ion insertion materials act as protective layers between an ion insertion layer and a liquid or gel-type ion conducting layer to prevent corrosion or other degradative effects of the ion insertion layers.

Figure 3:
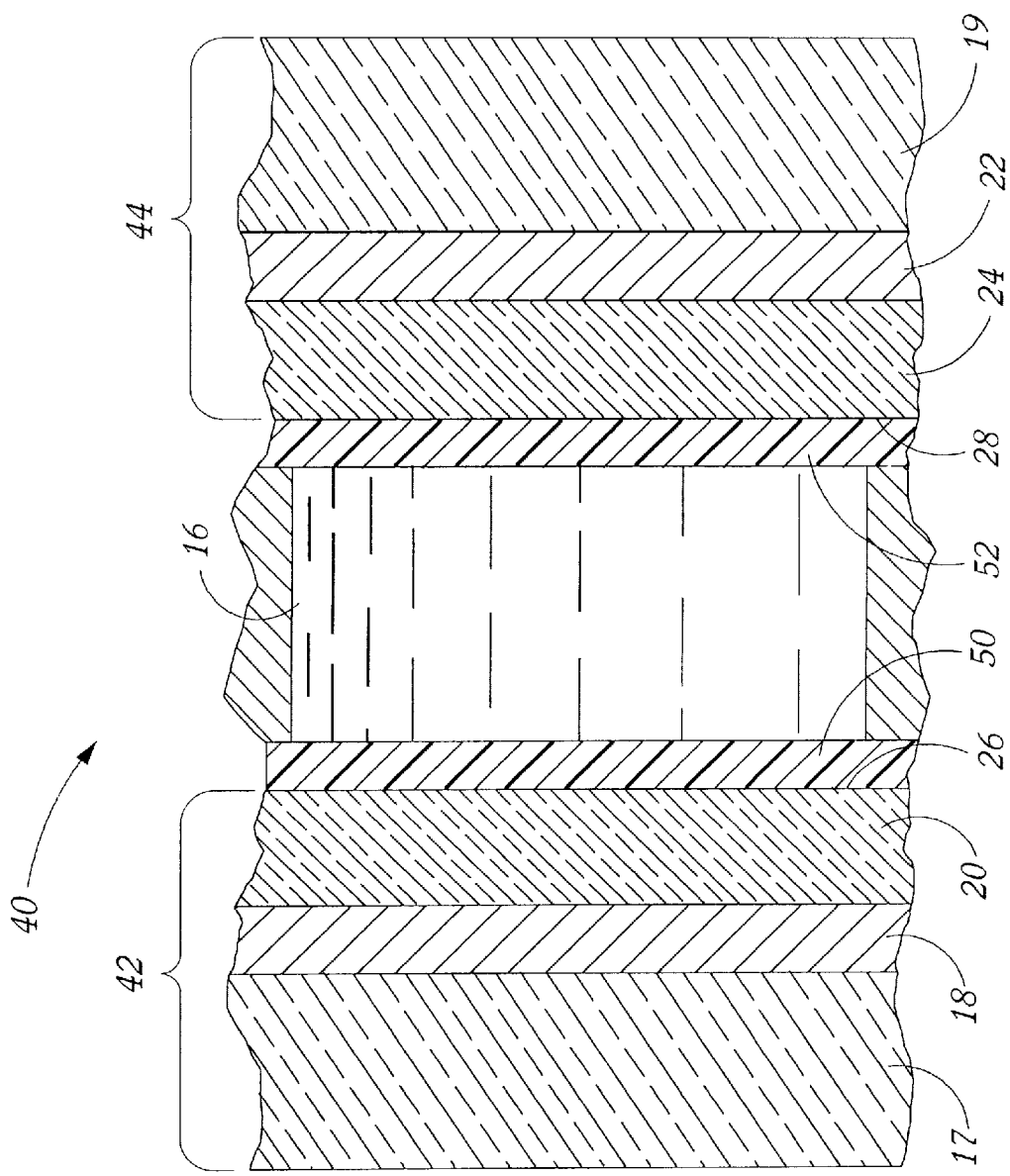
FIG. 3 is a diagrammatic cross-sectional view showing one embodiment of a liquid or gel-type electrochemical cell according to this invention having a protective solid ion conducting layer between each ion insertion layer and the liquid or gel-type electrolyte, and further comprising separate substrate, anode, and cathode layers.

One preferred embodiment of a liquid or gel-type electrochemical cell 40 with protective solid state ion conductor or electrolyte layers 50, 52 according to this invention is shown in FIG. 3. This comprises a first electrode-equipped section 42, a second electrode-equipped section 44, and a liquid or gel-type ion conducting layer 16 sandwiched between the first electrode-equipped section 42 and the second electrode-equipped section 44. First electrode-equipped section 42 of liquid or gel-type electrochemical cell 40 comprises first substrate 17, first electrode 18 disposed on substrate 17, a first ion insertion material 20 disposed on first electrode 18 and having a face 26 on a side opposite to the first electrode 18, and a first protective solid ion conducting layer 50 disposed on face 26 of first ion insertion material 20. Second electrode-equipped section 44 of liquid or gel-type electrochemical cell 40 comprises second substrate 19, second electrode 22 disposed on substrate 19, a second ion insertion material 24 disposed on second electrode 22 and having a face 28 on a side opposite to the second electrode 22, and a second protective solid ion conducting layer 52 disposed on face 28 of second ion insertion material 24.

First electrode-equipped section 42 and second electrode-equipped section 44 of electrochemical cell 40 of this invention are disposed in spaced relation to one another such that solid ion conducting layers 32 and 34 face each other and are separated by one or more spacers 35. The solid ion conducting layers 32 and 34 together with spacer(s) 35 define a void which is filled with liquid or gel-type ion conducting material 16.

Electrochemical cell 40 of the present invention has significantly improved durability compared to conventional liquid or gel-type electrochemical cell 10. The term "durability" as used herein refers to the ability to repeatedly cycle voltage through an electrochemical cell while maintaining the integrity of the electrochemical cell over a prolonged life-cycle. In reference to an electrochromic device, durability refers to the ability to repeatedly cycle voltage through an electrochromic device without increased resistance to loss of optical properties (e.g., color intensity). In reference to a lithium rechargeable battery, durability refers to the ability to repeatedly cycle voltage through a lithium rechargeable battery without a loss of charge-discharge capacity. In practice, a cycle life of greater than $10^7$ cycles is desirable for most applications. The term "improved durability" as used herein means that a liquid or gel-type electrochemical cell 40 of the invention has the ability to cycle with voltage for a greater number of cycles with significantly reduced loss of charge-discharge properties (when the electrochemical cell is a lithium battery) or without loss of optical properties (when the electrochemical cell is an electrochromic device) when compared to a conventional liquid or gel-type electrochemical cell 10.

A novel feature of the present invention which improves the durability of electrochemical cell 40, is the incorporation of protective solid state ion conducting layers 50 and 52 in liquid or gel-type electrochemical cell. It was discovered that solid ion conducting layers 50 and 52 act as protective layers by preventing liquid or gel-type ion conducting layer 16 from degrading first ion insertion material 20 and second ion insertion material 24, respectively, while still allowing the flow of positive ions through liquid or gel-type electrolyte layer 16 to either the first or second ion insertion layers 50 and 52. Consequently, protective solid-state ion conducting layers 50 and 52 increase the durability of the electrochemical cell 40 (FIG. 3) of this invention by minimizing or preventing degradation of ion insertion layers 20 and 24, which is a common problem with conventional liquid or gel-type electrochemical cell 10 (FIG. 1).

Solid ion conducting layers 50 and 52 of electrochemical cell 40 preferably comprise one or more solid electrolyte material(s) (i.e., solid ion conducting material(s)) that is/are an excellent conductor of a positively charged ion (e.g., Li$^+$ or H$^+$) and a poor electric conductor (e.g., a poor conductor of negatively charged electrons). As used throughout, the terms "electrolyte material" and "ion conducting material" are interchangeable and refer to a solid, liquid, or gel (polymer)-type material which conducts positive ions but does not conduct negative ions. Lithium ion (Li$^+$) conductors are a preferred material for solid ion conducting layers 50 and 52, since lithium ion conductors generally have the combined features of high ionic conductivity with greater chemical stability than do other solid ion conductors, such as hydrogen ion conductors. When electrochemical cell 40 is an electrochromic device, the solid ion conducting material for use as protective solid ion conducting layers 50 and 52 is preferably transparent. Suitable materials for use as protective solid ion conducting layers 50 and 52 include lithium aluminum fluoride (LiAlF$_4$), and lithium phosphorous oxinitride compounds including Li$_x$PO$_y$N$_z$, where "x" is approximately equal to 2.8, the sum of "2y+3z" is approximately equal to 7.8, and "z" has a value between 0.16 and 0.46. Such Li$_x$PO$_y$N$_z$ compounds are described in U.S. Pat. No. 5,597,660 to Bates, et al., which is incorporated herein by reference. Other suitable materials for the solid ion conducting layer include, but are not limited to, LiI, Li$_2$WO$_4$, LiSO$_4$, LiIO$_3$, Li$_4$SiO$_4$, Li$_2$Si$_2$O$_5$, LiAlSiO$_4$, Li$_4$(Si$_{0.7}$Ge$_{0.3}$)O$_4$, Li$_4$GeO$_4$, LiAlCl$_4$, Li$_3$PO$_4$, Li$_3$N, Li$_2$S, Li$_2$O, Li$_5$AlO$_4$, Li$_5$GaO$_4$, Li$_6$ZnO$_4$, LiAr$_2$(PO$_4$)$_3$, LiHf$_2$(PO$_4$)$_3$, LiInS$_2$, LiMgF and LiAlMgF$_4$. Solid ion conducting layers 50 and 52 of liquid or gel-type electrochromic device 40 are preferably between about 500–5000 Angstroms thick.

Similarly, liquid or gel-type ion conducting layer 16 of electrochromic device 40 should also be an electrolyte material that has high ionic conductivity and low electric conductivity. Preferably, the liquid or gel-type ion conducting layer 16 is an excellent conductor of lithium ions (Li$^+$). When ion conducting layer 16 is a liquid electrolyte layer, the liquid electrolyte may be obtained by dissolving a lithium salt in a suitable solvent—preferably a non-aqueous solvent. Suitable lithium salts for preparing ion conducting liquid electrolyte material 16 include LiClO$_4$, LiBF$_4$, LiAlCL$_4$, LiCF$_3$SO$_3$, LiAsF$_6$, LiCl, and other compounds known in the art which exhibit similar ion conducting properties. Suitable non-aqueous solvents for use in preparing liquid electrolyte material 16 include propylene carbonate, tetrahydrofuran and its derivatives, acetonitrile, 1,3-dioxalane-methyl-2-pyrrolidone, sulpholane methylformate, dimethyl sulfate, butyrolactone, 1,2-dimethoxyethane, and other non-aqueous solvents which are known in the art which exhibit similar properties. In one embodiment, ion conducting layer 16 is a liquid electrolyte material comprising LiClO$_4$ dissolved in propylene carbonate to form a 1 molar concentration. When electrolyte layer 16 is a gel-type electrolyte material (also known in the art as a polymer gel electrolyte), the gel-type electrolyte material may be obtained by adding a conventional liquid electrolyte (e.g., lithium perchlorate dissolved in propylene carbonate) to a cross-linkable polymer host which functions as a container for the liquid electrolyte material. Suitable polymer hosts include, but are not limited to, polyacrylonitrile, poly(ethylene oxide), poly(methyl methacrylate), poly(vinylidene fluoride), poly(vinylidene fluoride-co-hexafluoropropylene), polyethylene glycol, diacrylate, and trimethylolpropane triacrylate.

A necessary requirement in the selection of the solid electrolyte material for use as solid ion conducting layers 50 and 52 and the selection of liquid or gel-type electrolyte material 16 is that both the solid ion conducting material and liquid or gel-type electrolyte material has the same positive ion. That is, if the positive ion in the liquid or gel-type electrolyte material is a lithium ion (Li$^+$), then the positive ion in the solid electrolyte material should also be a lithium ion (Li$^+$).

Referring again to electrochemical cell 40 of this invention as illustrated in FIG. 3, solid ion conducting layers 50 and 52 are sandwiched between ion insertion layers 20 and 24. As used herein, the term "ion insertion material" refers to a mixed conductor (i.e., ionic and electric) in which positive and negative ions can be rapidly and reversibly inserted. That is, for charge neutrality of the ion insertion material, an electron (i.e., a negative ion) is inserted into the ion insertion material from the electrode 18 or 20 whenever a positive ion (e.g., $Li^+$ or $H^+$) is inserted into the ion insertion material from the ion conducting layer 16, and likewise an electron is extracted whenever a positive ion is extracted. Examples of ion-insertion materials which are suitable for ion insertion layers 20 and 24 in a lithium rechargeable battery include, but are not limited to, $Li_xTiS_2$, $Li_xV_2O_5$, $Li_xCoO_2$, $Li_xMn_2O_4$, $Li_xTiO_2$, $Li_xSnO_2$ and $Li_xNiO_2$.

An ion insertion material in an electrochromic device is an ion insertion material whose optical properties (e.g., degree of color change) depends strongly on the number of inserted ions. Electrochromic ion insertion materials may thus be regarded as storage batteries with a visible state of color change. Suitable electrochromic materials for ion insertion layers 20 and 24 when electrochemical cell 40 is an electrochromic device include cathodic electrochromic materials, which take on color in a reduced state, and anodic electrochromic materials, which take on color in an oxidized state. Suitable materials for ion insertion layers 20 and 24 in an electrochromic device include, but are not limited to, transition metal oxides, transition metal sulfides, transition metal oxysulfides, transition metal halides, selenides, tellurides, chromates, molybdates, tungstates, vanadates, niobates, tantalates, titanates, stannates, etc. especially oxides, sulfides and stannates of metals of Groups IV-B, V-B, and VI-B, and oxides and sulfides of Lanthanide Series metals, and more particularly, tungsten oxide, molybdenum oxide, titanium oxide, vanadium oxide, niobium oxide, iridium oxide, rhodium oxide, nickel oxide, cerium oxide, copper stannate, and cobalt tungstate. Ion insertion layers 20 and 24 are each preferably between about 1000 to 10,000 angstroms thick, and more preferably between 1000–5000 angstroms thick. Preferably, when electrochemical cell 40 is an electrochromic device, ion insertion layer 20 is tungsten oxide ($WO_3$) (which takes on color in a reduced state) and is about 5000 angstroms thick, and ion insertion layer 24 is a complementary electrochromic ion insertion material, that is, an anodic electrochromic ion insertion material which takes on color in an oxidized state. Suitable anodic electrochromic ion insertion materials include $V_2O_5$, $IrO_2$, and $NiO_2$. Preferably ion insertion layer 24 is $V_2O_5$ and is about 5000 angstroms thick.

Referring again to FIG. 3, ion insertion materials 20 and 24 of electrochemical cell 40 are sandwiched between first and second electrodes 18 and 22. Suitable materials for first and second electrodes 18 and 22, for use in lithium rechargeable batteries include highly conductive metals such as aluminum, copper, nickel, platinum, and palladium. When electrochemical cell 40 is lithium rechargeable battery, first and second electrodes 18 and 22 of device 40 are preferably between 1000 Å and 10,000 Å thick. Suitable materials for first and second electrodes 18 and 22 for use in liquid or gel-type electrochromic devices include highly conductive, transparent materials such as doped metal oxides, including tin oxides ($SnO_2$:F or $SnO_2$:Sb), indium-tin oxides (ITO) such as $In_2O_3$:Sn, and zinc oxides (ZnO:In, $ZnO_2$:Al), and ultrathin, transparent metallic films including, but not limited to, gold (Au), aluminum (Al), silver (Ag), and copper (Cu). However, other substrates of various kinds of materials may be used depending on the use of electrochemical cell 40. When electrochemical cell 40 is an electrochromic device, first and second electrodes 18 and 22 of electrochemical cell 40 are preferably doped indium-tin oxide (ITO) and are between 1000 and 5000 angstroms thick. Alternatively, when electrochromic cell 40 is an electrochromic mirror device, a metallic reflector layer typically replaces one of the electrodes 18 or 22.

Referring again to FIG. 3, first and second electrodes 18 and 22 of electrochemical device 40 are sandwiched between substrates 17 and 19. Suitable substrates 17 and 19 when electrochemical device 40 is a lithium rechargeable battery may be transparent or non-transparent and include glass, polymers, and thin plastic substrates. Suitable substrates 17 and 19 when electrochemical device 40 is an electrochromic device, one or both substrates 17 and/or 19 is transparent, and substrates 17 and 19 are preferably glass or plastic substrates. Alternatively, resins such as polymethylmethacrylate, polycarbonate, and the like may be used.

Referring again to FIG. 3, the assembly of electrochemical cell 40 of this invention will be described. For the sake of simplicity, but meant to be limiting, the assembly will be described for the assembly of an electrochromic device. Electrochromic device 40 may be assembled by first separately preparing sections 42 and 44 of the device 40. To assemble section 42, a film of transparent conducting material is deposited on substrate 17 to form first electrode 18. The deposition method for forming electrode 18 may be any film-forming methods known in the art, such as vacuum deposition, sputtering, ion plating, chemical vapor deposition, screen printing, sol-gel deposition, and the like. Next, ion insertion layer 20 comprising an electrochromic material is formed by depositing electrochromic material such as vanadium oxide ($V_2O_5$) onto electrode 18 by any of the film-forming techniques described above. Next, solid ion conducting layer 50 is deposited onto ion insertion layer 20 by depositing a solid electrolyte such as $LiAlF_4$, or $Li_xPO_yN_z$ onto ion insertion layer 20 by known deposition techniques. For example, a layer of $Li_xPO_yN_z$ may be deposited by radio-frequency (rf) magnetron sputtering of a $Li_3PO_4$ target in a nitrogen atmosphere as described in U.S. Pat. No. 5,597,660 which is incorporated herein by reference, to complete section 12. Due to the nature of the deposition process for forming solid ion conducting layer 50, pinholes may occur in solid ion conducting layer 50 of device 40. However, as will be described below, such pinholes are not detrimental to device 40.

Section 44 of electrochromic device 40 is then assembled in a manner similar to that described above for the assembly of section 42, with the exception that ion insertion material 24 of section 44 is either an electrochromic material that is complementary to ion insertion material 20, or ion insertion material 24 may be a non-electrochromic ion insertion material such as magnesium fluoride ($MgF_2$), tin oxide ($SnO_2$), or silicon dioxide ($SiO_2$).

Once sections 42 and 44 of device 40 have been assembled, sections 42 and 44 are positioned parallel to one another with first and second protective solid ion conducting layers 50 and 52 facing each other and spaced apart by one or more spacers 35 around the perimeter edges of layers 50 and 52. Spacer(s) 35 is typically a polymer, and serves not only to separate sections 42 and 44, but also to contain liquid or gel-type ion conducting material 16. Other suitable materials for use as spacer(s) 35 include tape, polymers containing glass beads, and other materials known to those skilled in the art. Spacer(s) 35, together with protective solid ion conducting layers 32 and 34, define a space for containing liquid or gel-type ion conducting material 16. After sections 42 and 44 are joined, a hole is drilled either through section 42 or section 44 to the space defined by layers 50, 52, and spacer(s) 35. A vacuum is applied to the hole to evacuate the defined void, and then liquid or gel-type ion conducting material 16 is injected into the voided space and the hole is sealed.

The above-described method of assembling electrochemical device 40 is merely exemplary and is not intended to be limiting. Thus, other methods known in the art may be utilized to assemble electrochromic device 40 of this invention. In addition, the method of assembly described above is not limited to the assembly of electrochromic devices, but the above described method as well as other methods known in the art, may be utilized to assembly electrochemical devices 40 of this invention comprising protective solid ion conducting layers 50 and 52. For example, the method described by Lee et al. (*Electrochemical and Solid-State Letters* (1999) 2:425), which is incorporated herein by reference, may also be employed for assembling device 40.

To operate electrochromic device 40 described above, two leads (not shown) are connected to transparent conducting electrode layers 18 and 22 to provide an electric potential and circuit across electrochromic device 40 which is necessary to cause electrochromic layer 20 and ion insertion layer 24 to change color during an applied voltage. The leads in turn may be connected to a polarity reversing switch, which allows for the polarity of the charge across the electrochromic device 40 to be reversed, thereby changing the electrochromic layers from colored to colorless, or vice versa.

As discussed above, since the solid protective ion conducting layers 50 and 52 are formed in the same manner as a solid electrolyte layer in a conventional solid-state electrochemical cell, some pinholes may be present in the protective solid electrolyte layers 50 and/or 52 of liquid or gel-type electrochemical cell 40 of this invention. Surprisingly, it was discovered by the inventors that solid protective ion conducting layers 50 and 52 need not be free of pinholes to provide sufficient protection to ion insertion layers 20 and 24. Any pinholes present in the solid protective ion conducting layers 50 and/or 52 were discovered to be, at the most, minimally detrimental to the performance of liquid or gel-type electrochemical cell 40. Referring to FIG. 3, if for example a pinhole (not shown) was present in solid ion conducting layer 50, only a pinhole-sized amount of liquid electrolyte 16 would pass through the solid ion conducting layer 50 and come in contact with face 26 of ion insertion layer 20. Consequently, only a pinhole-sized area of degradation may occur on face 26, which would not cause the dramatic deterioration of liquid or gel-type electrochemical cell 40, which is a common occurrence in conventional liquid or gel-type electrochemical cells 10 (FIG. 1). While not wishing to be bound by any theory, the inventors believe that degradation of conventional liquid or gel-type electrochemical cells, such as cell 10 shown in FIG. 1, may occur as a result of chemical corrosion of faces 26 and 28 ion insertion layers 20 and 24, respectively, by the liquid or gel-type ion conducting material 16. This is due to the fact that, in conventional liquid or gel-type electrochemical cells 10, the liquid or gel-type electrolyte layer 16 is in contact with the entire surface of faces 26 and 28 of ion insertion layers 20 and 24, respectively. Therefore, whereas in conventional liquid or gel-type electrochemical cells 10 the liquid or gel electrolyte layer 16 can eventually degrade the entire face of ion insertion layers 20 and 24 at the liquid electrolyte/ion insertion layer interface, the novel design of electrochemical cell 40 avoids this degradation problem observed with conventional electrochemical cells 10 in that electrochemical cell 40 of this invention has protective solid ion conducting layers 50 and 52 interposed between ion insertion layers 20 and 24, respectively, and liquid or gel-type electrolyte layer 16. Protective solid ion conducting layers 50 and 52 are thick enough to prevent liquid or gel-type electrolyte 16 from contacting ion insertion layers 20 and 24, while still allowing the flow of positive ions such as $Li^+$ from ion insertion layer 20 to ion insertion layer 24 during discharge of cell 40, and similarly to allow the flow of the positive ions in the reverse direction (from ion insertion layer 24 to ion insertion layer 20) when the cell 40 is being charged.

Figure 4:
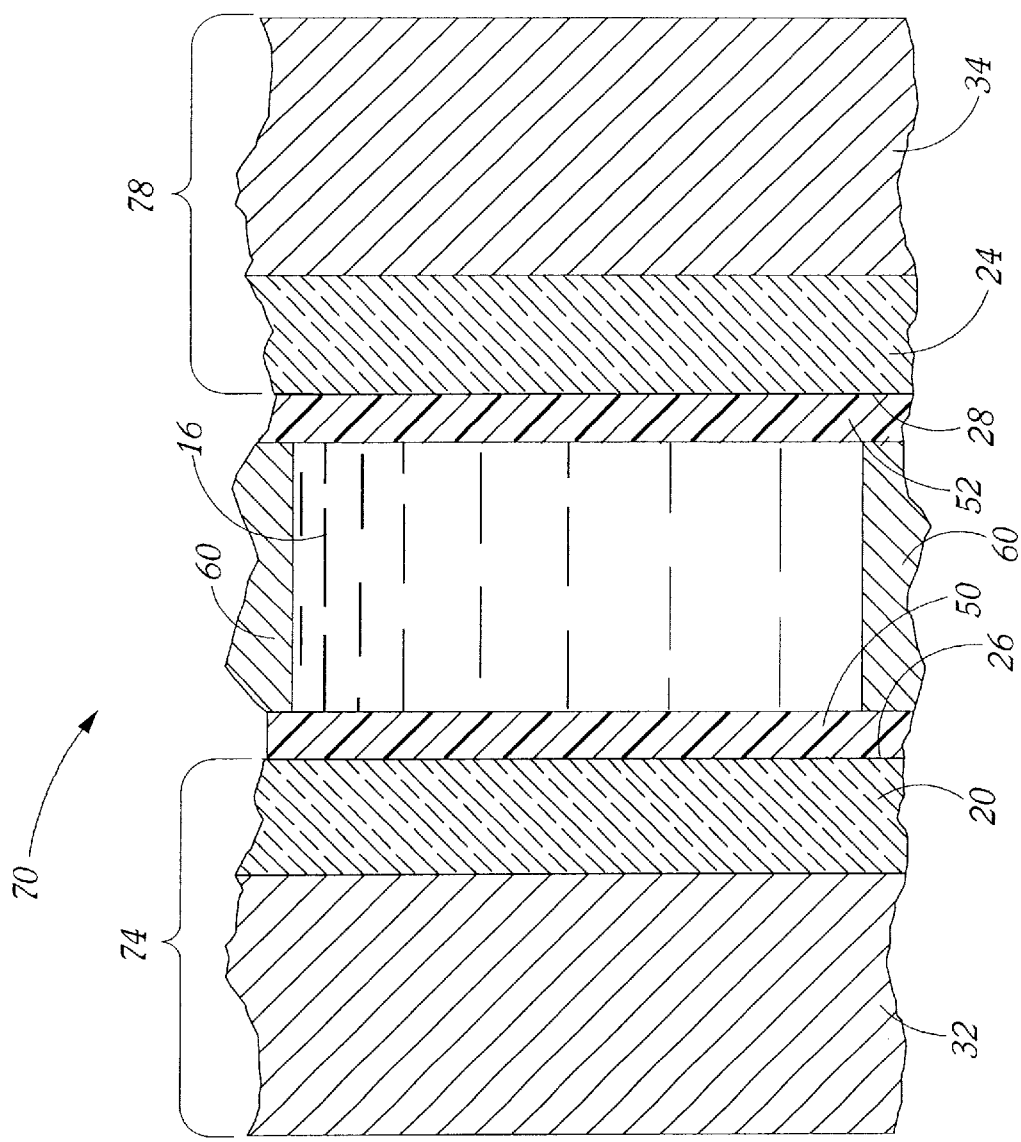
FIG. 4 is a diagrammatic cross-sectional view showing an alternative embodiment of a liquid or gel-type electrochemical cell according to this invention having a protective solid ion conducting layer between each ion insertion layer and the liquid or gel-type electrolyte, and further comprising a first substrate layer which serves as the anode, and a second substrate layer which serves as the cathode.

FIG. 4 illustrates an alternative embodiment of this invention, which is an improvement over conventional electrochemical cell 30 illustrated in FIG. 2. Electrochemical cell 70 of FIG. 4 comprises first electrode-equipped section 74, second electrode-equipped section 78, and a liquid or gel-type ion conducting layer 16 sandwiched therebetween. First and second electrode-equipped sections 74 and 78 are separated by spacers 35 as described above. First electrode-equipped section 74 comprises a first electrode 32, a first ion insertion material 20 disposed on first electrode 32 and having a face 26 on a side opposite to the first electrode 32, and a first protective solid ion conducting layer 50 disposed on face 26 of first ion insertion material 20. Second electrode-equipped section 78 comprises second electrode 34, a second ion insertion material 24 disposed on second electrode 34 and having a face 28 on a side opposite to the second electrode 34, and a second protective solid ion conducting layer 52 disposed on face 28 of second ion insertion material 24. Thus, the primary difference between electrochemical cell 40 of FIG. 3 and electrochemical cell 70 of FIG. 4 is that electrode 32 of electrochemical cell 70 functions both as the substrate and electrode 17 and 18 of electrochemical cell 40 (FIG. 3), and likewise electrode 34 of electrochemical cell 70 (FIG. 4) functions both as the substrate and electrode 19 and 22 of electrochemical cell 30. Electrochemical cell 70 of this invention has increased durability compared to conventional electrochemical cell 30 due to the presence of protective solid ion conducting layers 50 and 52 for the reasons explained above.

As discussed above, this invention in general provides a method of protecting any ion insertion layer from the degradative effects of a liquid or gel-type electrolyte by inserting a protective solid ion conducting layer between the ion insertion layer and the liquid or gel-type electrolyte layer. Consequently, the scope of this invention includes methods of protecting ion insertion layers in devices other that those described in FIGS. 3 and 4, and further includes any device having a protective solid ion conducting layer disposed between an ion insertion layer and a liquid or gel-type electrolyte layer.

Figure 5:
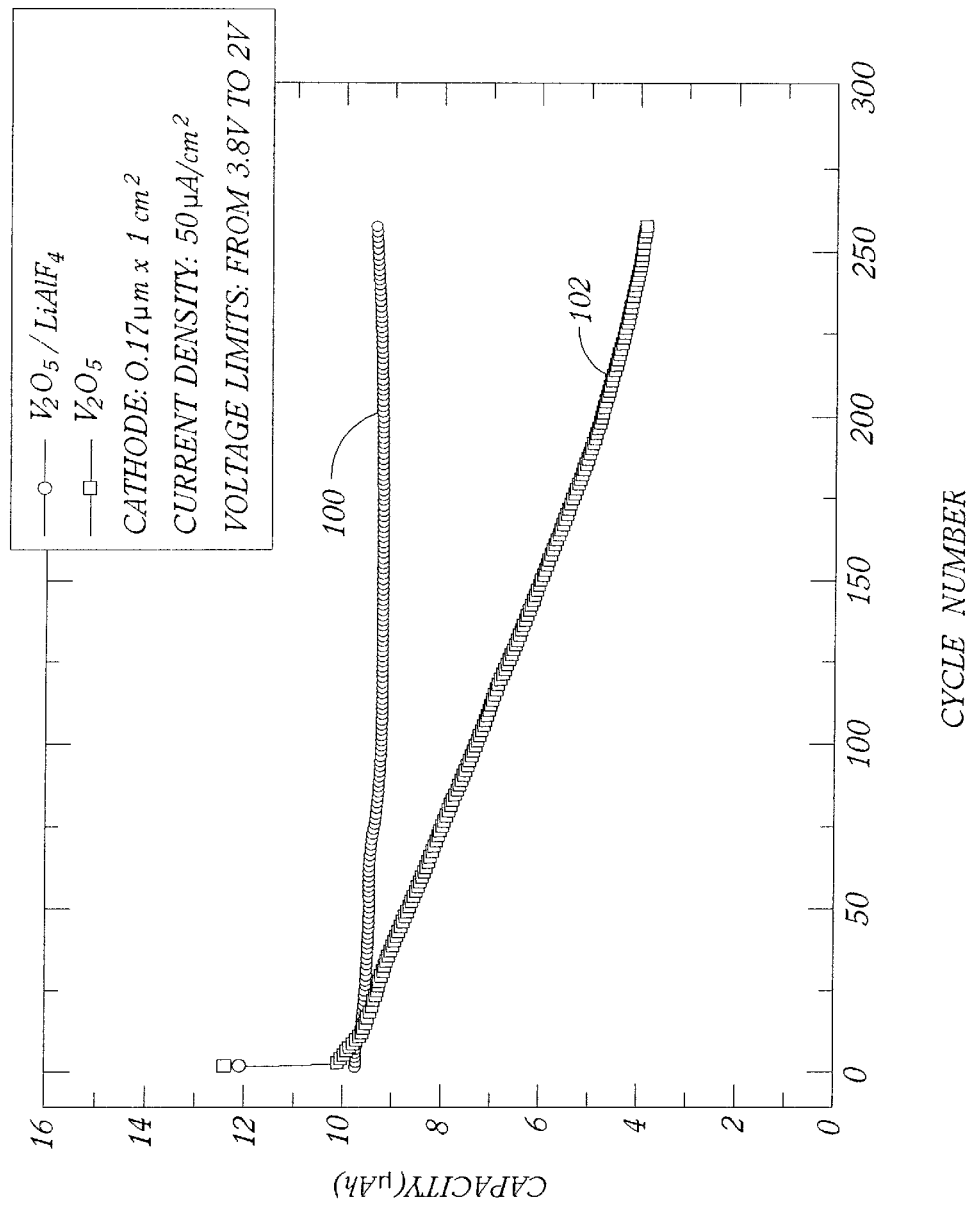
FIG. 5 is a graph of capacity in $\mu Ah/cm^2$ versus cycle number for a vanadium oxide electrode coated with a protective solid ion conducting layer of lithium aluminum fluoride (curve 100) and an uncoated vanadium oxide electrode (curve 102)
Figure 6:
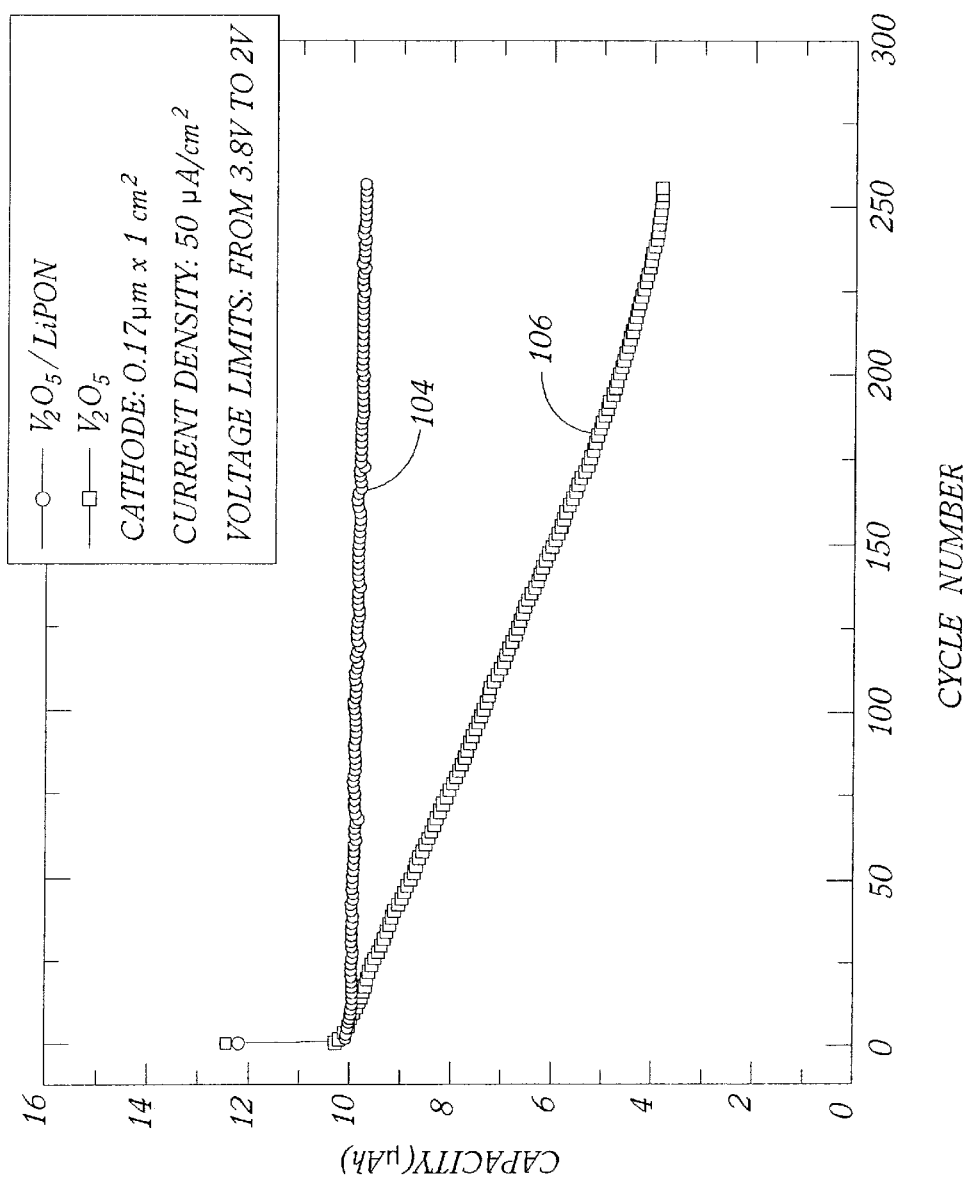
FIG. 6 is a graph of capacity in $\mu Ah/cm^2$ versus cycle number for a vanadium oxide electrode coated with a protective solid ion conducting layer of lithium phosphorous oxinitride material (curve 104) and an uncoated vanadium oxide electrode (curve 106)

FIG. 5 compares the charge/discharge capacity of a protected vanadium oxide ($V_2O_5$) electrode of this invention with an unprotected electrode. In FIG. 5, curve 100 represents the ion insertion behavior of a $V_2O_5$ ion insertion layer coated with a thin film of protective solid ion conducting layer lithium aluminum fluoride ($LiAlF_4$). Curve 102 represents the ion insertion behavior of an uncoated $V_2O_5$ electrode. Both electrodes were tested in a liquid or gel-type electrochemical cell comprising 1 M $LiClO_4$ in propylene carbonate as the liquid or gel-type electrolyte. Curve 100 shows that, for a $V_2O_5$ electrode coated with a protective solid electrolyte film, the capacity remains substantially constant over repeated cycling of the electrode. In contrast, the $V_2O_5$ electrode which does not have a protective coating, represented by curve 102, loses capacity with repeated cycling. FIG. 6 summarizes the results of a similar experiment in which the durability of a $V_2O_5$ electrode of this invention coated with a protective film of a lithium phosphorous oxinitride material ($Li_xPO_yN_z$) (curve 104) was compared to an unprotected $V_2O_5$ electrode (curve 106). As shown in FIG. 6, the $Li_xPO_yN_z$-coated $V_2O_5$ electrode (curve 104) had substantially improved durability compared to the unprotected $V_2O_5$ electrode (curve 106).

Figure 7:
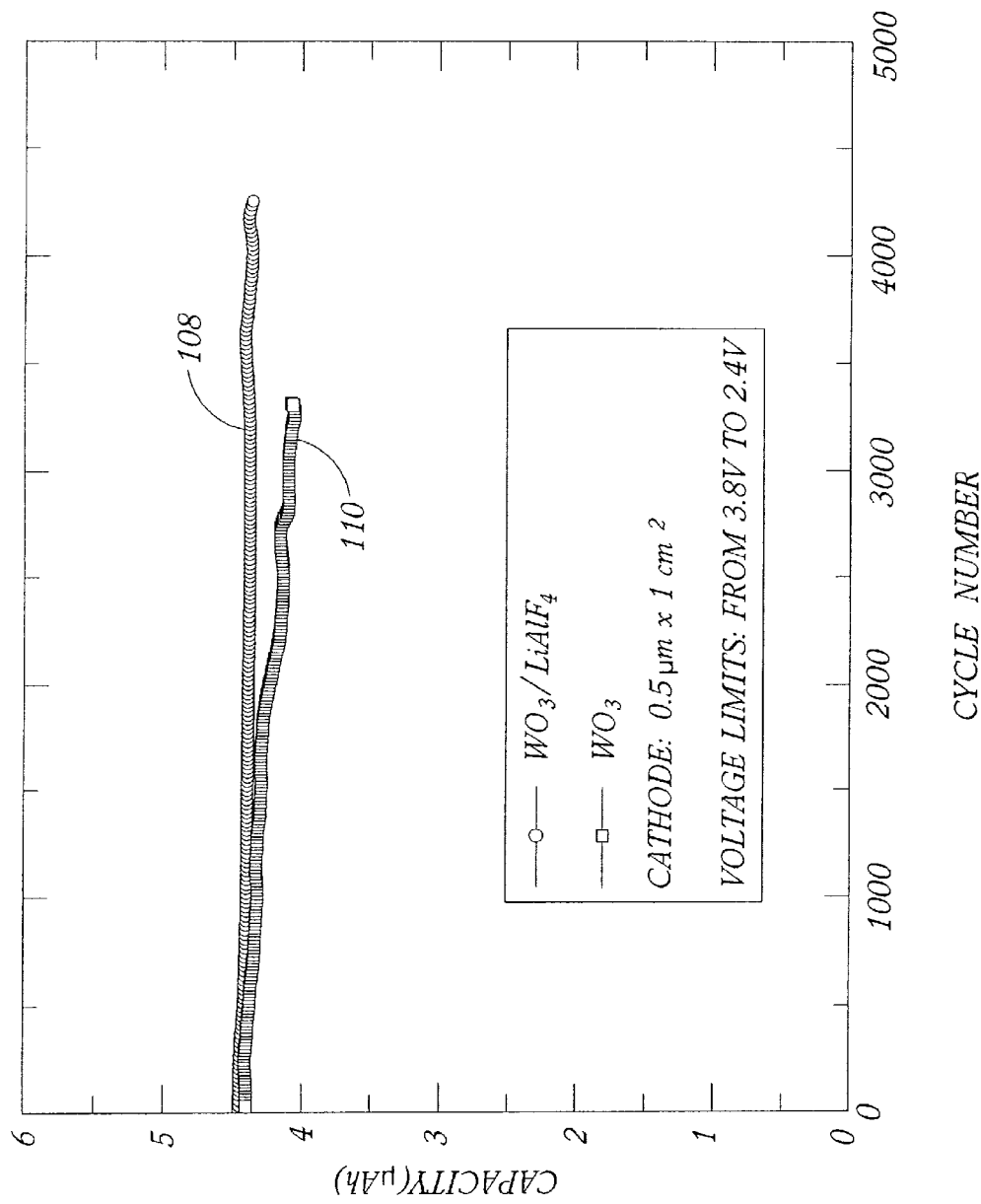
FIG. 7 is a graph of capacity in $\mu Ah/cm^2$ versus cycle number for a tungsten oxide electrode coated with a protective solid ion conducting layer of lithium aluminum fluoride (curve 108) and an uncoated tungsten oxide electrode (curve 110)
Figure 8:
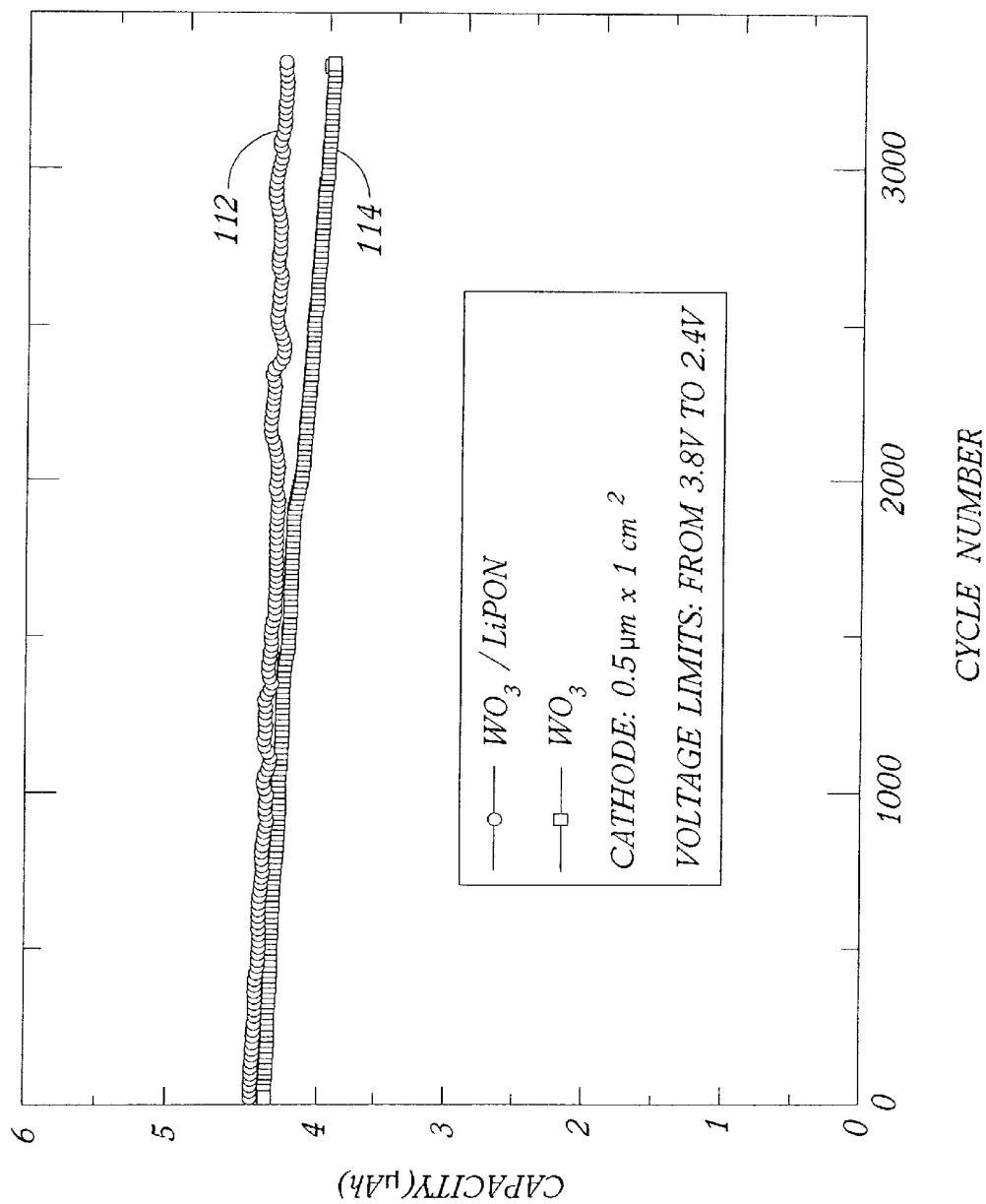
FIG. 8 is a graph of capacity in $\mu Ah/cm^2$ versus cycle number for a tungsten oxide electrode coated with a protective solid ion conducting layer of a lithium phosphorous oxinitride material (curve 112) and an uncoated tungsten oxide electrode (curve 114).

As a further illustration of the increased durability of liquid or gel-type electrochemical cell of the present invention, FIG. 7 shows a comparison of the charge/discharge capacity for lithium ions of two different tungsten oxide ($WO_3$) electrodes. Curve 108 represents the ion insertion behavior of a $WO_3$ electrode of this invention coated with a protective solid electrolyte thin film of $LiAlF_4$, and curve 110 represents the ion insertion behavior of an uncoated $WO_3$ electrode. Again, the capacity of the electrode coated with a protective solid electrolyte film of $LiAlF_4$ (curve 108) remained substantially constant over repeated cycling of the electrode. In contrast, the $V_2O_5$ electrode which did not have a protective coating, represented by curve 110, lost capacity with repeated cycling. FIG. 8 shows a comparison of the charge/discharge capacity for lithium ions of a tungsten oxide ($WO_3$) electrode of this invention coated with a thin film of the protective solid ion conducting layer a lithium phosphorous oxinitride ($Li_xPO_yN_z$) (curve 112), and an uncoated $WO_3$ electrode (curve 114).

EXAMPLES

1. Preparation of Thin Films of $V_2O_5$ Protected with $LiAlF_4$ or $Li_xPO_yN_z$ Thin films of $V_2O_5$ were deposited by thermal evaporation of $V_2O_5$ powders. The base pressure for the deposition process was typically $10^{-5}$ mbar. The solid electrolyte, $LiAlF_4$, was also deposited by conventional thermal evaporation of the corresponding powder. The solid electrolyte, $Li_xPO_yN_z$, was deposited by RF magneton sputtering of a $Li_3PO_4$ target in a nitrogen atmosphere.

Each electrode was cycled at a constant current between preset voltage limits. Glass beaker-type test cells were used to evaluate the electrochemical properties of the vanadium oxide half-cells. In these half-cell experiments, the setup consists of a $V_2O_5$ film as the working electrode, lithium metal foil as the counter electrode and reference electrode, and 1 M $LiClO_4$ propylene carbonate as the electrolyte. FIG. 5 compares the charge/discharge capacity for lithium ions versus cycle number of a vanadium oxide electrode of this invention coated with $LiAlF_4$ (curve 100) to the capacity versus cycle number of an uncoated vanadium oxide electrode (curve 102). Curve 100 shows that, for a $V_2O_5$ electrode coated with a protective solid electrolyte film of $LiAlF_4$, the capacity remains substantially constant over repeated cycling of the electrode. In contrast, the $V_2O_5$ electrode which does not have a protective coating, represented by curve 102, loses capacity with repeated cycling.

FIG. 6 compares the charge/discharge capacity for lithium ions versus cycle number of a vanadium oxide electrode of this invention coated with Lipon™ (curve 104) to the capacity versus cycle number of an uncoated vanadium oxide electrode (curve 106). Curve 104 shows that, for the $V_2O_5$ electrode coated with a protective solid electrolyte film of $Li_xPO_yN_z$, the capacity remains substantially constant over repeated cycling of the electrode. Again, the $V_2O_5$ electrode which does not have a protective coating, represented by curve 106, loses capacity with repeated cycling.

2. Preparation of Thin Films of $WO_3$ Protected with $LiAlF_4$ or $Li_xPO_yN_z$ Thin films of $WO_3$ were deposited by thermal evaporation of $WO_3$ powders. The base pressure for the deposition process was typically $10^{-5}$ mbar. The solid electrolyte, $LiAlF_4$, was also deposited by conventional thermal evaporation of the corresponding powder. The solid electrolyte, $Li_xPO_yN_z$, was deposited by RF magneton sputtering of a $Li_3PO_4$ target in a nitrogen atmosphere.

Each electrode was cycled at a constant current between preset voltage limits. Glass beaker-type test cells were used to evaluate the electrochemical properties of the tungsten oxide half-cells. In these half-cell experiments, the setup consists of a $WO_3$ film as the working electrode, lithium metal foil as the counter electrode and reference electrode, and 1 M $LiClO_4$ propylene carbonate as the electrolyte. FIG. 7 shows a comparison of the cycling capacity of two different tungsten oxide ($WO_3$) electrodes. Curve 108 represents a $WO_3$ electrode of this invention coated with a protective solid electrolyte thin film of $LiAlF_4$, and curve 110 represents an uncoated $WO_3$ electrode. Again, the capacity of the electrode coated with a protective solid electrolyte film of $LiAlF_4$ (curve 108) remained substantially constant over repeated cycling of the electrode. In contrast, the $V_2O_5$ electrode which did not have a protective coating, represented by curve 110, lost capacity with repeated cycling.

FIG. 8 shows a comparison of the cycling capacity of a tungsten oxide ($WO_3$) electrode of this invention coated with a protective solid electrolyte thin film of $Li_xPO_yN_z$ (curve 112), and an uncoated $WO_3$ electrode (curve 114). Again, the capacity of the $WO_3$ coated with the protective solid ion conducting layer is improved over the uncoated $WO_3$.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The words "comprise," "comprising", "include," "including," and "includes" when used in this specification and in the following claims are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. A method of preventing degradation of an ion insertion material, wherein said ion insertion material has a surface which faces a liquid or polymer gel ion conducting material, said method comprising providing a solid ion conducting layer between said surface of said ion insertion material and said liquid or polymer gel ion conducting material.

2. The method of claim 1, wherein said solid ion conducting layer is a lithium phosphorous oxinitride.

3. The method of claim 1, wherein said solid ion conducting layer is lithium aluminum fluoride.

4. The method of claim 1, wherein said ion insertion material is an electrochromic material.

5. A method of producing a durable electrochemical cell, comprising:
   (a) preparing a first electrode-equipped section by the method comprising:
      (i) depositing a first ion insertion material on a first conducting material; and
      (ii) depositing a first solid ion conducting material on said first ion insertion material;
   (b) preparing a second electrode-equipped section by the method comprising (i) depositing a second ion insertion material on a second conducting material; and (ii) depositing a second solid ion conducting material on said second ion insertion material;

(c) disposing said first electrode-equipped section on said second electrode-equipped section, wherein said first solid ion conducting material is parallel to and spaced apart from said second solid ion conducting material by a plurality of spacers, wherein said first solid ion conducting material, said second ion conducting material, and said plurality of spacers define a void; and (d) inserting a liquid or gel ion conducting material into said void.

6. The method of claim 5, wherein said first and second solid ion conducting layers are lithium aluminum fluoride.

7. The method of claim 5, wherein said first and second solid ion conducting layers are lithium phosphorous oxinitride.

8. The method of claim 5, wherein said first ion insertion layer is a cathodic electrochromic materials.

9. The method of claim 5, wherein said second ion insertion layer is an anodic electrochromic material.

10. The method of claim 5, wherein said first ion insertion layer is selected from the group consisting of transition metal oxides, transition metal sulfides, transition metal oxysulfides, transition metal halides, selenides, tellurides, chromates, molybdates, tungstates, vanadates, niobates, tantalates, titanates, and stannates.

11. The method of claim 10, wherein said first ion insertion layer is tungsten oxide.

12. The method of claim 5, wherein said second ion insertion layer is selected from the group consisting of $V_2O_5$, $IrO_2$, and $NiO_2$.

13. The method of claim 12, wherein said second ion insertion layer is $V_2O_5$.

14. The method of claim 5, wherein said first and second solid ion conducting layers have a thickness of about 1000 to 5000 Angstroms.

15. The method of claim 5, further comprising, prior to step (a)(i), depositing said first conducting material on a first substrate, and prior to step (b)(i), depositing said second conducting material on a second substrate.

16. An electrochemical cell having increased durability, comprising first and second electrodes;

first and second ion insertion layers disposed on said first and second electrodes;

first and second solid ion conducting layers disposed on said first and second ion insertion layers; and a liquid or gel ion conducting material disposed between said first and second solid ion conducting layers.

17. The electrochemical cell of claim 16, wherein said first and second solid ion conducting layers are lithium aluminum fluoride.

18. The electrochemical cell of claim 16, wherein said first and second solid ion conducting layers are lithium phosphorous oxinitride.

19. The electrochemical cell of claim 16, wherein said first ion insertion layer is a cathodic electrochromic material.

20. The electrochemical cell of claim 16, wherein said second ion insertion layer is an anodic electrochromic material.

21. The electrochemical cell of claim 16, wherein said first ion insertion layer is selected from the group consisting of transition metal oxides, transition metal sulfides, transition metal oxysulfides, transition metal halides, selenides, tellurides, chromates, molybdates, tungstates, vanadates, niobates, tantalates, titanates and stannates.

22. The electrochemical cell of claim 21, wherein said first ion insertion layer is tungsten oxide.

23. The electrochemical cell of claim 16, wherein said second ion insertion layer is selected from the group consisting of $V_2O_5$, $IrO_2$, and $NiO_2$.

24. The electrochemical cell of claim 23, wherein said second ion insertion layer is $V_2O_5$.

25. The electrochemical cell of claim 16, wherein said first and second solid ion conducting layers have a thickness of about 1000 to 5000 Angstroms.

26. The electrochemical cell of claim 16, wherein said first and second electrodes are connected to a voltage source in a reversible manner, such that polarity of voltage applied across said electrochemical cell is reversible.

27. The electrochemical cell of claim 16, further comprising a first substrate disposed on said first electrode on a side opposite that of said first ion insertion layer, and a second substrate disposed on said second electrode on a side opposite that of said second ion insertion layer.

28. The electrochemical cell of claim 16, wherein said cell is a lithium secondary battery.

29. The electrochemical cell of claim 16, wherein said cell is an electrochromic device.

30. The electrochemical cell of claim 16, the solid ion conducting material has positive ions and the liquid or gel ion conducting material has positive ions, and wherein the positive ions of the solid ion conducting material are identical to the positive ions of the liquid or gel ion conducting material.

* * * * *